United States Patent
Saboo

(10) Patent No.: US 10,307,909 B1
(45) Date of Patent: Jun. 4, 2019

(54) SELECTIVELY UPLOADING OPERATIONAL DATA GENERATED BY ROBOT BASED ON PHYSICAL COMMUNICATION LINK ATTRIBUTE

(71) Applicant: X Development LLC, Mountain View, CA (US)

(72) Inventor: Rohit Ramesh Saboo, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 385 days.

(21) Appl. No.: 14/875,634

(22) Filed: Oct. 5, 2015

(51) Int. Cl.
| | |
|---|---|
| G06F 15/16 | (2006.01) |
| B25J 9/16 | (2006.01) |
| G05D 1/00 | (2006.01) |
| H04W 4/30 | (2018.01) |
| G08C 17/02 | (2006.01) |

(52) U.S. Cl.
CPC .......... B25J 9/1689 (2013.01); G05D 1/0088 (2013.01); G08C 17/02 (2013.01); H04W 4/30 (2018.02)

(58) Field of Classification Search
CPC . B25J 9/1689; B25J 9/1674; G08B 13/19695; G05B 19/4183; G06Q 30/02; H04L 47/10; H04L 67/104; H04L 29/06; H04W 28/20; H04W 4/00; H04W 4/70; H04W 72/082; H04W 72/085;
(Continued)

(56) References Cited

U.S. PATENT DOCUMENTS

| | | | |
|---|---|---|---|
| 6,430,471 B1 * | 8/2002 | Kintou | H04L 29/06 180/169 |
| 7,197,370 B1 * | 3/2007 | Ryskoski | G05B 19/4183 700/108 |

(Continued)

FOREIGN PATENT DOCUMENTS

WO 2004042982 5/2004

OTHER PUBLICATIONS

Akyildiz, I. F., Melodia, T., & Chowdhury, K. R. (2007). A Survey on Wireless Multimedia Sensor Networks. Computer Networks, 51(4), 921-960.
(Continued)

Primary Examiner — Dustin Nguyen
(74) Attorney, Agent, or Firm — Middleton Reutlinger

(57) ABSTRACT

Methods, robots, systems, and computer-readable media are provided for selectively uploading operational data generated by a robot to a remote computing system. In various implementations, a robot may classify a plurality of operational data points generated by the robot with a plurality of operational data types. The robot may also identify one or more attributes of a physical communication link between the robot and a remote computing system. Based on the one or more attributes of the physical communication link, the robot may identify a plurality of strategies for uploading operational data from the robot to the remote computing system. Each strategy may govern how operational data points of at least one of the plurality of operational data types is uploaded. The robot may then selectively upload the plurality of classified operational data points to the remote computing system pursuant to the plurality of strategies.

15 Claims, 6 Drawing Sheets

(58) Field of Classification Search
CPC .......... H04W 4/30; H04W 4/90; G01D 4/002; G08C 19/02; F42B 30/006; G01S 5/0252; G05D 1/0088
See application file for complete search history.

(56) References Cited

U.S. PATENT DOCUMENTS

| | | | |
|---|---|---|---|
| 7,493,407 B2 | 2/2009 | Leedom et al. | |
| 7,948,936 B2 | 5/2011 | Lohr et al. | |
| 7,954,359 B1* | 6/2011 | Paderewski | F42B 30/006 73/12.01 |
| 8,718,822 B1* | 5/2014 | Hickman | B25J 9/1674 700/214 |
| 8,909,264 B1* | 12/2014 | Higuchi | H04W 4/00 455/466 |
| 9,638,544 B2* | 5/2017 | Kondo | G01D 4/002 |
| 9,942,840 B2* | 4/2018 | Smith | H04W 4/70 |
| 2003/0169690 A1* | 9/2003 | Mott | H04L 47/10 370/238 |
| 2003/0184447 A1* | 10/2003 | Otterbach | G08C 19/02 340/854.9 |
| 2005/0054285 A1* | 3/2005 | Mears | G06Q 30/02 455/2.01 |
| 2007/0236343 A1* | 10/2007 | Becksted | G08B 13/19695 340/521 |
| 2008/0086236 A1* | 4/2008 | Saito | G01S 5/0252 700/245 |
| 2009/0037033 A1* | 2/2009 | Phillips | G05D 1/0088 701/2 |
| 2010/0118812 A1* | 5/2010 | Kim | H04W 72/082 370/329 |
| 2010/0278086 A1* | 11/2010 | Pochiraju | H04W 28/20 370/310 |
| 2013/0003591 A1* | 1/2013 | Novak | H04W 72/085 370/252 |
| 2014/0156073 A1* | 6/2014 | Zhang | B25J 9/1689 700/257 |
| 2016/0234303 A1* | 8/2016 | Liu | H04L 67/104 |
| 2017/0223712 A1* | 8/2017 | Stephens | H04W 4/90 |

OTHER PUBLICATIONS

Xia, F. (2008). QoS Challenges and Opportunities in Wireless Sensor/Actuator Networks. Sensors, 8(2), 1099-1110.

Duchstein, Patrik. "Bluetooth Khepera Robot Control and Communication." (2004). 57 pages.

Troubleyn, E., Moerman, I., & Demeester, P. (2013). QoS Challenges in Wireless Sensor Networked Robotics. Wireless Personal Communications, 70(3), 1059-1075.

* cited by examiner

SELECTIVELY UPLOADING OPERATIONAL DATA GENERATED BY ROBOT BASED ON PHYSICAL COMMUNICATION LINK ATTRIBUTE

BACKGROUND

Autonomous and semi-autonomous robots may be in communication with various remote computing systems, such as a robot management system, often using wireless communication links. The robots may, at various intervals, provide the robot management system with operation data, such as position coordinates, "heartbeat," battery status, sensor measurements, and so forth. When a wireless communication link is reliable, it may be preferable for the robots to provide a robot management system with relatively comprehensive operation data. However, robots often may operate in contexts such as busy warehouses or disaster zones in which wireless communication links are noisy or otherwise suboptimal. If the wireless communication links become unreliable, or available bandwidth diminishes, it may not be practicable for robots to upload comprehensive operation data.

SUMMARY

The present disclosure is generally directed to methods, apparatus, and computer-readable media (transitory and non-transitory) for selectively uploading operational data generated by a robot to a remote computing system based on one or more attributes of a physical communication link between the robot and the remote computing system. A robot may classify a plurality of operational data points it generates with a plurality of operational data point types. Examples of operational data point types include robot location (e.g., a GPS coordinate at a given point in time), "heartbeat" (e.g., a periodic ping or signal that indicates the robot is still operational), available battery power, and so forth. A physical communication link available between a robot and a remote computing device may be analyzed, e.g., by the robot or the remote computing system, to determine various attributes of the physical communication link. Based on the link attributes, the robot may identify and/or select various strategies that govern how various types of operational data generated by the robot are uploaded to the remote computing system. Then, the robot may selectively upload operational data to the robot management system, or temporarily store the data for batch upload later, pursuant to one or more of the identified/selected strategies.

In some implementations, a method may be provided that includes: classifying, by a robot, a plurality of operational data points generated by the robot with a plurality of operational data types; identifying, by the robot, one or more attributes of a physical communication link between the robot and a remote computing system; identifying, by the robot, based on the one or more attributes of the physical communication link, a plurality of strategies for uploading operational data from the robot to the remote computing system, wherein each strategy governs how operational data points of at least one of the plurality of operational data types is uploaded; and selectively uploading the plurality of classified operational data points from the robot to the remote computing system pursuant to the plurality of strategies.

This method and other implementations of technology disclosed herein may each optionally include one or more of the following features.

In various implementations, the one or more attributes of the physical communication link may include available bandwidth. In various implementations, the method may further include: organizing, by the robot, the physical communication link into a plurality of logical channels, wherein each logical channel is associated with at least one operational data type. In various implementations, identifying the plurality of strategies may include identifying, for the plurality of logical channels, a plurality of corresponding strategies that govern how operational data points are uploaded through the plurality of channels. In various implementations, the method may further include assigning a priority to each logical channel, wherein identifying the plurality of strategies comprises assigning strategies to the logical channels based on priorities assigned to the logical channels. In various implementations, the physical communication link may be organized into a number of logical channels that is selected based at least in part on the one or more attributes of the physical communication link.

In various implementations, the selectively uploading may include uploading a subset of operational data points of a particular operational data point type pursuant to a strategy associated with the particular operational data point type. In various implementations, the selectively uploading may include uploading a statistic computed based on operational data points of a particular operational data point type pursuant to a strategy associated with the particular operational data point type. In various implementations, the selectively uploading may include uploading a latest operational data point of a set of operational data points of a particular operational data point type pursuant to a strategy associated with the particular operational data point type.

In various implementations, the physical communication link may be wireless. In various implementations, one of the plurality of operational data types may include robot heartbeats. In various implementations, one of the plurality of operational data types may include robot location. In various implementations, one of the plurality of operational data types may include robot battery status. In various implementations, the method may further include analyzing a pattern of requests for operational data from the robot, wherein identifying the strategies may include generating one or more strategies based on the analysis.

Other implementations may include a non-transitory computer readable storage medium storing instructions executable by a processor to perform a method such as one or more of the methods described above. Yet another implementation may include a system, such as a robot, that includes memory and logic operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
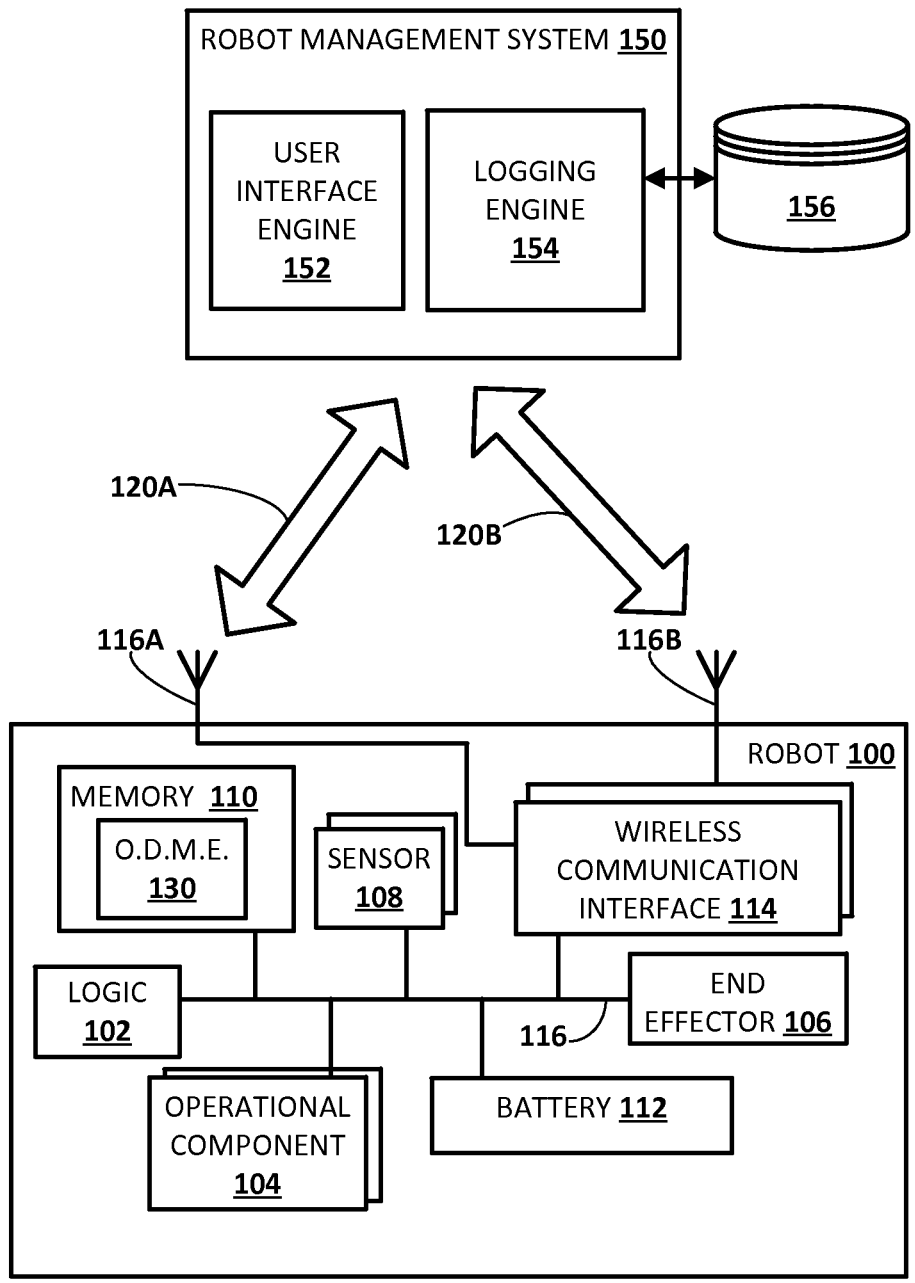
FIG. 1 schematically depicts an example environment in which disclosed techniques may be implemented, in accordance with various implementations.

FIG. 1 schematically depicts an example environment in which disclosed techniques may be implemented to selectively upload operational data from a robot 100 to a remote computing system, such as a robot management system 150, in accordance with various implementations. Robot 100 may take various forms, including but not limited to a telepresence robot, a robot arm, a humanoid, an animal, an insect, an aquatic creature, a wheeled device, a submersible vehicle, an unmanned aerial vehicle ("UAV"), and so forth. Robot 100 may include logic 102 operably coupled to one or more operational components 104, one or more end effectors 106, one or more sensors 108, memory 110, one or more batteries 112, and one or more wireless communication interfaces 114 via one or more internal buses 116.

Logic 102 may, in various implementations, include one or more processors, such as one or more so-called "real time processors" that are guaranteed to perform various operations within various temporal constraints. Memory 110 may come in various forms, including but not limited to random access memory ("RAM"), read only memory ("ROM"), dynamic RAM ("DRAM"), flash, etc. In various implementations, logic 102 may execute one or more instructions contained in memory 110 to operate an operational data management engine ("O.D.M.E." in FIG. 1) 130. Operational data management engine 130 will be described in more detail with regard to FIG. 2.

As used herein, "operational components" 104 of robot 100 may refer to actuators, motors (e.g., servo motors), joints, shafts, gear trains, wheels, tracks, pumps (e.g., air or liquid), pistons, drives, or other components that may create and/or undergo propulsion, rotation, and/or motion to move components of robot 100 relative to each other, and/or to move robot 100 as a whole. Some operational components may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with various types of "grippers," including but not limited to "impactive" (e.g., "grab" objects using opposing digits), "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth.

Sensors 108 may take various forms, including but not limited to cameras, light sensors (e.g., passive infrared), pressure sensors, pressure wave sensors (e.g., microphones), proximity sensors, torque sensors, force sensors, radars, range finders, accelerometers, gyroscopes, compasses, position coordinate sensors (e.g., global positioning system, or "GPS," triangulation-based sensors such as Wi-Fi triangulation, etc.), speedometers, drop off sensors (e.g., to detect an edge of a raised surface), and so forth. While sensors 108 are depicted as being integral with robot 100, this is not meant to be limiting. In some implementations, sensors 108 may be located external to, but may be in direct or indirect communication with, robot 100.

Robot 100 may include various communication interfaces that facilitate exchange of data between robot 100 and remote computing devices through physical communication links. Some physical communication links may be wired. For example, Ethernet, USB, serial, PCIe external, and other similar technology may be used to exchange data with one or more remote computing systems through one or more wired communication links (not depicted), such as when robot 100 is connected to a charging station. Other physical communication links which may be more likely to be available to semi-autonomous or autonomous robots in the field are wireless. For example, wireless communication interface(s) 114 may come in various forms that utilize various wireless communication technologies, including but not limited to Wi-Fi, Bluetooth, cellular (e.g., 3G, 4G LTE, etc.), radio, and so forth. Wireless communication interface 114 may be operably coupled with one or more antenna 116, of which two examples, 116A and 116B, are depicted in FIG. 1. Each antenna 116 may be configured to transmit data provided (e.g., modulated) by wireless communication interface 114 over one or more wireless communication links 120A-B. Robot 100 may be equipped with a variety of combinations of wireless technologies. As one non-limiting example, first antenna 116A could be a Wi-Fi antenna, and second antenna 116B could be a Bluetooth antenna.

Battery 112 may come in various forms. Some batteries, such as such as lithium-ion ("Li-ion") battery, may be rechargeable, e.g., when robot 100 visits a charging station (not depicted). Other batteries may be "single-use," and may be replaceable as needed. In various implementations, an amount of charge in battery 112 may be discernable, e.g., by logic 102.

Robot 100 may be in communication with various remote computing systems for various purposes, such as managing robot 100 to various degrees, debugging robot 100, and so forth. For example, robot 100 may be in communication with a robot management system 150 over one or more wireless communication links 120A-B, e.g., by way of antennas 116A-B. Robot management system 150 may include one or computing systems connected by one or more networks (not depicted). An example of such a computing system is depicted schematically in FIG. 6. Various modules or engines may be implemented as part of robot management system 150 as software, hardware, or any combination of the two. For example, in FIG. 1, robot management system 150 includes a user interface engine 152 and a logging engine 154.

User interface engine 152 may be configured to receive, as input, commands from various sources, such as human technicians. In some implementations, user interface engine 152 may provide one or more user interfaces, locally and/or distributed to remote computing devices (e.g., as interactive web pages), which may be operated by users such as technicians to perform various tasks, such as controlling and/or influencing robot 100. Robot management system 150 may, for example, be used to exert various degrees of control over robot 100.

In some implementations, user interface engine 152 may provide a graphical user interface that is operable to request operational data (i.e. pull) from robot 100 on demand. For example, a technician could operate such an interface to request a battery level, a current robot location, and so forth. In some implementations, the same interface or a different interface may be operable to configure how robot 100 selectively uploads operational data (i.e. pushes) to a remote computing device (e.g., 150) automatically. For example, a user that wishes to only see a particular type of operational data may, in effect, define a strategy "on the fly" that causes robot 100 to upload only operational data of the targeted operational data type.

"Operational data" as used herein may refer to a variety of data that may be generated by robot 100 during operation. Various "types" of operational data may be generated by robot 100. For example, a sensor 108 configured to provide data indicative of a location of robot 100 (e.g., GPS) may provide operational data points in the form of position coordinates, which may be considered an operational data type of "ROBOT LOCATION" or something similar. A battery sensor may be configured to produce operational data points indicative of an amount of power remaining in a battery 112 of robot 100, which may be considered an operational data type of "BATTERY STATUS" or something similar. Other types of operational data may be generated by other components of robot 100. For example, logic 102 may be sampled at various points in time to provide operational data points about its performance, e.g., CPU load. In some implementations, one or more components of robot 100 may cooperate to produce an operational data point referred to herein as a robot "heartbeat." A robot heartbeat may include various data, and in some implementations may be used as a periodic "ping" that notifies remote computing systems such as robot management system 150 that robot 100 is still operating. Operational components 104 may also generate operational data, e.g., from associated torque sensors. As will be discussed herein, operational data points may be classified as being particular operational data "types." An operational data point's "type" may then be used to determine how it is selectively uploaded to remote computing devices pursuant to various strategies.

Figure 2:
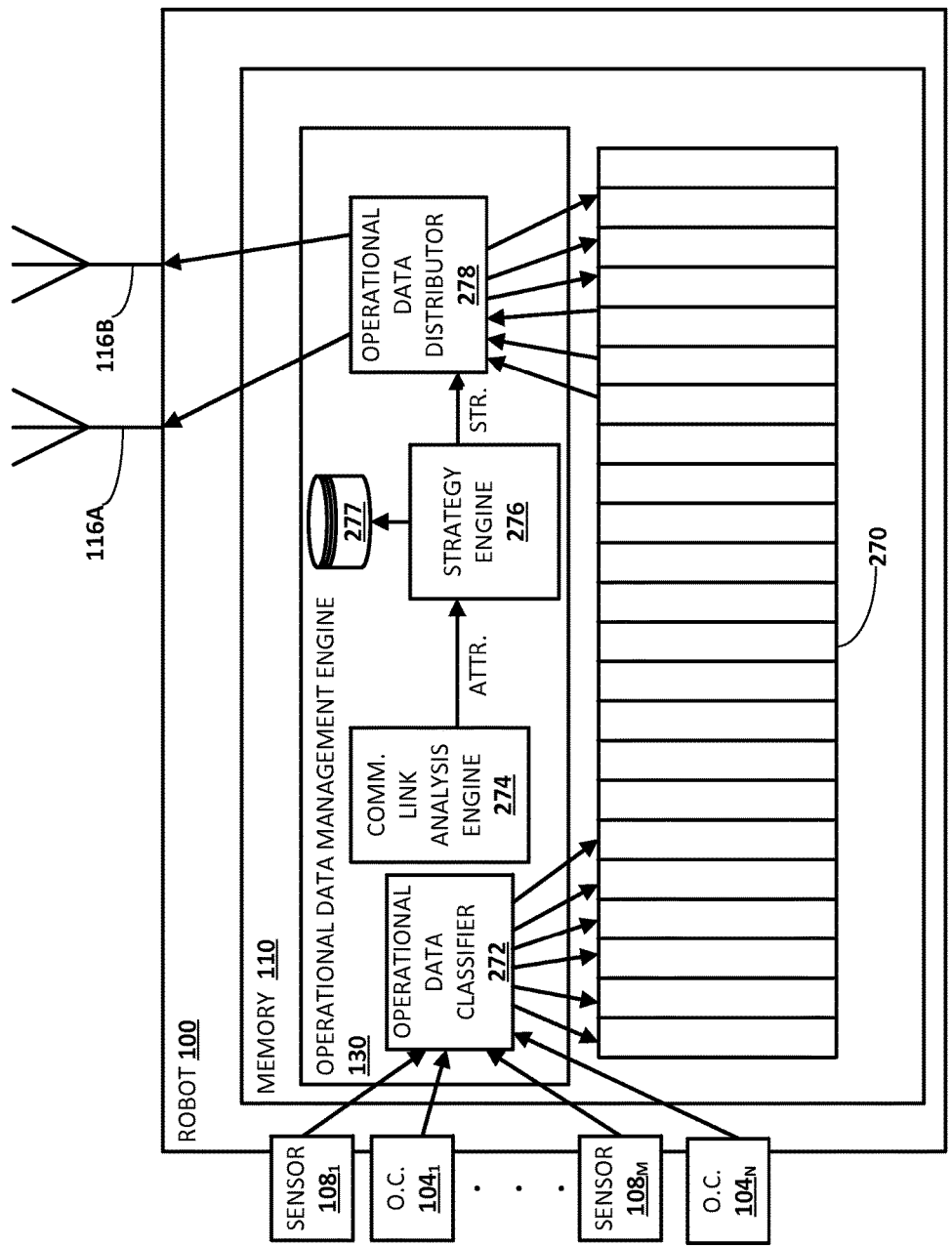
FIG. 2 schematically depicts in more detail than FIG. 1 example components of a robot that may selectively upload operational data to a remote computing system based on one or more attributes of a physical communication link between the robot and the remote computing system, in accordance with various implementations.

FIG. 2 schematically depicts in more detail than FIG. 1 an example of how robot 100 may selectively upload and/or temporarily store operational data based on one or more attributes of a physical communication link between robot 100 and a remote computing system, such as robot management system 150, in accordance with various implementations. Robot 100 operates, e.g., in memory 110, an instance of operational data management engine 130. Operational data management engine 130 may be configured to obtain operational data from various sources, such as sensors 108, operational components 104 (e.g., torque sensors), logic 102, and so forth. Operational data management engine 130 may then classify that operational data as being of a particular operational data type. Once operational data is classified, operational data management engine 130 may then selectively upload (or store temporarily) that classified operational data pursuant to one or more strategies, e.g., by transmitting at least a subset of the operational data vie one or more antennas 116A-B through one or more physical communication links (e.g., 120A-B). To perform these operations, in some implementations, operational data management engine 130 may include a variety of modules or engines, such as an operational data classifier 272, a communication link analysis engine 274, a strategy engine 276, and an operational data distributor 278.

Operational data classifier 272 may be configured to identify various groups of operational data points that are generated by robot 100 and classify the identified operational data points as being of a particular operational data type. How operational data classifier 272 classifies operational data points may be determined in various ways. In some implementations, a user may configure robot 100, e.g., directly and/or through a user interface (e.g., provided by user interface engine 152), to classify particular operational data in various ways. In some implementations, robot 100 may be manufactured with a default operational data point classification scheme.

The act of classifying an operational data point may be performed in various ways. For example, in some implementations, to "classify" operational data point may mean to store, e.g., in a portion of memory 110 such as a ring buffer 270, data that is indicative of the classification of that operational data point. For example, in some implementations, an operational data point and its associated classification(s) may be stored in contiguous memory locations of ring buffer 270. In other implementations, an operational data point may be stored with a pointer that points to another memory location storing an indication of the classification of the operational data point. In other implementations in which operational data is uploaded as it is generated, operational data points may not be classified in memory (at least not for a significant amount of time). Rather, operational data points may be packaged with data indicative of their classification (e.g., in registers without ever being stored in RAM) and then transmitted to a remote computing device.

Communication link analysis engine 274 may be configured to determine, at any given point in time, one or more attributes of one or more physical communication links between robot 100 and a remote computing device, such as robot management system 150. For example, communication link analysis engine 274 may interface with various drivers or other logic associated with wireless communication interface(s) 114 to determine various attributes of a wireless communication links 120A and 120B. Attributes of wireless communication links 120A and 120B that may be pertinent to how operational data is uploaded include but are not limited to available data bandwidth (also referred to as bit-rate), signal bandwidth (i.e. the difference between upper and lower frequencies in a continuous set of frequencies), latency, reliability, and/or a variety of quality of service ("QoS") parameters such as error rate, availability, jitter, noise, throughput, and so forth.

Strategy engine 276 may be configured to identify one or more strategies stored in an index 277. As noted above, a strategy may govern how operational data points classified as a particular operational data type are treated under various conditions associated with a physical communication link, such as wireless communication links 120A and 120B. In various implementations, index 277 may include a lookup table or similar mechanism that may be consulted, e.g., by strategy engine 276, to determine which strategies are applicable to operational data classified as a particular operational data type. Strategy engine 276 may provide strategies it identifies to operational data distributor 278. In various implementations, a strategy may dictate that operational data of a particular operational data type be uploaded and/or stored temporarily on robot 100 in whole, in part (e.g., a subset of the operational data points, every xth operational data point), in representative part (e.g., a statistic based on the operational data points, such as sum, average, median, etc.), and so forth.

Operational data distributor 278 may be configured to selectively upload or temporarily store operational data points pursuant to one or more strategies received from strategy engine 276. For example, in FIG. 2, operational data distributor 278 may transmit operational data classified as a first operational data type through first antenna 116A and/or second antenna 116B (depending on which is currently providing a physical communication link), and may selectively store operational data classified as a second operational data type in buffer 270. In some implementations, operational data points stored in buffer 270 by operational data distributor 278 may be stored there temporarily (and in some instances may be locked to prevent overwriting) until robot 100 has a physical communication link available that is more suitable to upload this operational data.

In some implementations, a physical communication link between robot 100 and a remote computing system may be organized (e.g., multiplexed) into a plurality of logical channels. Each logical channel may be associated with one or more operational data types, and may be assigned a priority that corresponds to an importance of the one or more operational data types. Each channel also may be associated with a plurality of strategies for selectively uploading and/or temporarily storing operational data points of those one or more operational data types. The strategy employed for each channel may be selected based on one or more attributes of the physical communication link and/or the priority assigned to that channel.

Figure 3:
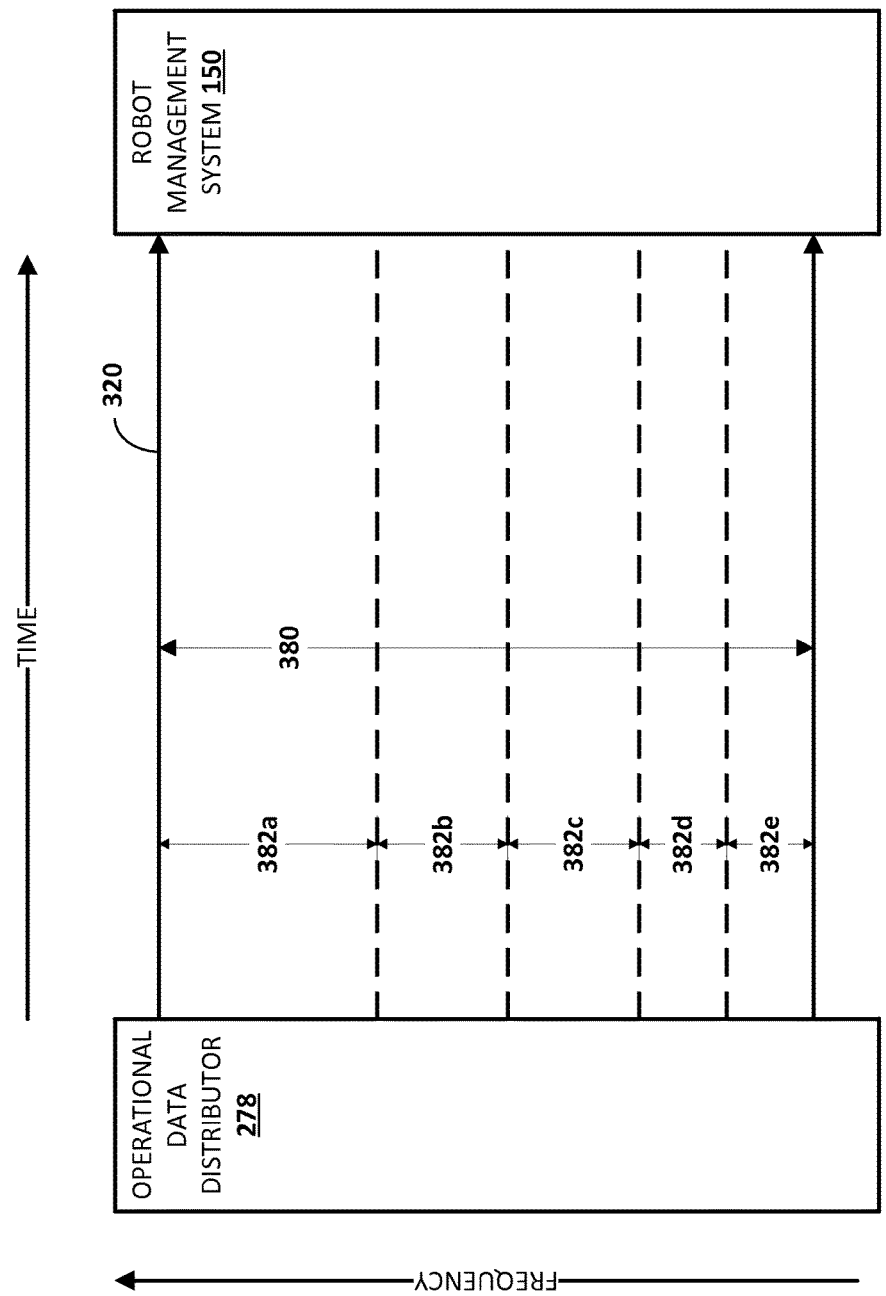
FIGS. 3 and 4 depict examples of how a robot may organize a physical communication link into a plurality of logical channels, in accordance with various implementations.

FIG. 3 depicts schematically an example of how a wireless physical communication link 320 between robot 100 and robot management system 150 may be organized (e.g., multiplexed) into logical channels 382a-e. In this example, physical communication link 320 is depicted as a range of continuous wireless frequencies that collectively define total bandwidth 380 of physical communication link 320. Each logical channel 382 has been allocated a frequency sub-range, e.g., by operational data distributor 278 or another component acting as a multiplexer. In some implementations, a logical channel 382 may be allocated a frequency sub-range that has a width that corresponds to its assigned priority. For example, in FIG. 3, first logical channel 382a has the highest priority, as evidenced by the fact that its allocated frequency subrange has the greatest width. Second logical channel 382b and third logical channel 382c have slightly lower priorities, as evidenced by the fact that their allocated frequency sub-ranges have smaller widths than first logical channel 382a. Similarly, fourth and fifth logical channels 382d and 382e have frequency sub-ranges with the smallest widths, demonstrating that these logical channels have the lowest priority.

In some implementations, each logical channel 382 may be allocated a predetermined fraction of the entire bandwidth 380 of physical communication link 320. If the total bandwidth 380 available decreases (e.g., due to noise caused by interference, distance from an access point, etc.), then the frequency sub-range bandwidths allocated to each logical channel 382 may decrease in a corresponding fashion. In some implementations, if the overall bandwidth 380 of physical communication link 320 decreases below a particular threshold, then the lowest priority channels (e.g., 382d and 382e) may be dropped. In some implementations, operational data points meant to be transmitted through those dropped logical channels instead may be temporarily stored in whole or in representative part (e.g., a subset of the operational data points, a statistic based on the operational data points, every xth operational data point, etc.) in memory 110 of robot 100, e.g., until such time as physical communication link 320 improves.

As noted above, in various implementations, a strategy for uploading operational data through a logical channel 382 may be selected based at least in part on the one or more attributes of the physical data link. How strategies are employed at a given logical channel 382 may be configured based on the operational data type associated with the given logical channel. For example, it may be important that particular operational data types, such as robot heartbeats, locations, or other similar operational data points, are uploaded from robot 100 to a remote computing device, at least in some fashion. Thus, for instance, a logical channel 382 associated with a particularly important operational data type may employ a first strategy that uploads all such operational data when physical communication link 320 is highly reliable and/or has sufficient bandwidth. When physical communication link 320 has intermediate reliability and/or bandwidth, the logical channel 382 may employ a second strategy that uploads an acceptable subset of the operational data points, e.g., every xth operational data point, only the latest operational data point within a given time interval, etc. When physical communication link 320 has poor reliability and/or low bandwidth, the logical channel 382 may employ a third strategy that uploads a minimal subset of the operational data points, or a statistical representation of a plurality of operational data points (e.g., sum, average, median, standard deviation, etc.). And so on. Of course, these are just examples; more or less than three strategies may be selectively employed at each logical channel 382.

Figure 4:
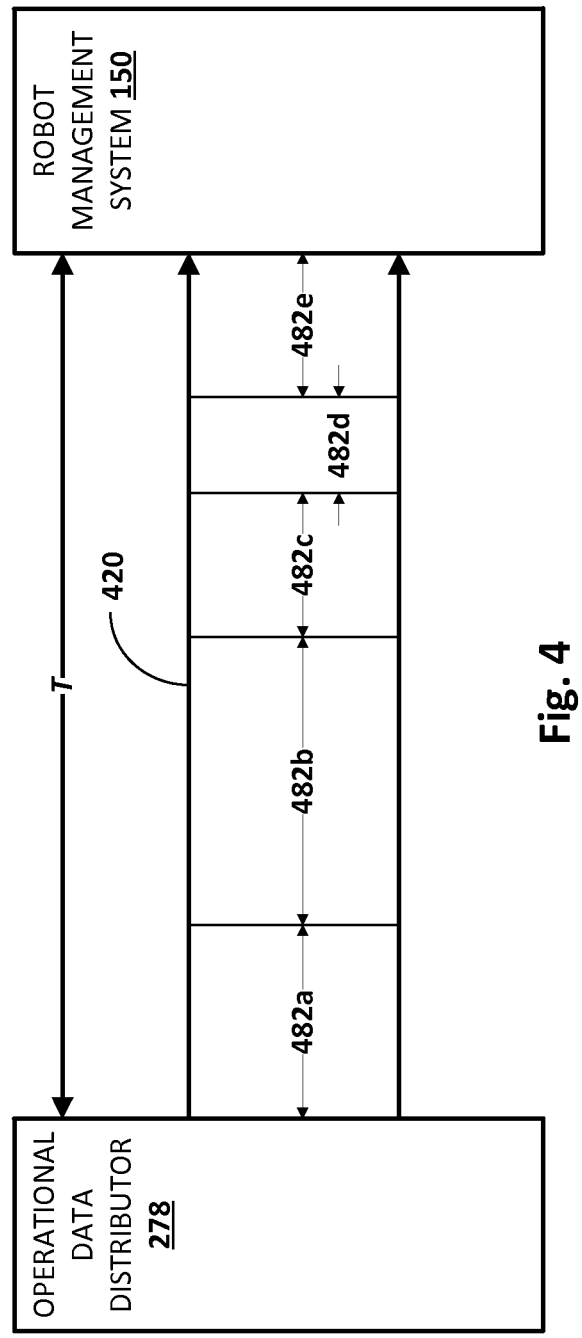

FIG. 4 depicts an alternative example of how a physical communication link 420 may be organized into logical channels 482a-e. In this example, rather than each logical channel 482 being allocated a frequency sub-range as was the case in FIG. 3, each logical channel 482 is allocated a portion of a time interval T in which it may upload operational data points pursuant to various strategies associated with the logical channel 482. Second logical channel 482b may have the highest priority of the five logical channels 482a-e, as evidenced by the fact that it has been allocated the longest sub-time interval. Fourth logical channel 482d may have the lowest priority as evidenced by the fact that it has been allocated the shortest sub-time interval. Otherwise, temporal logical channels such as 482a-e depicted in FIG. 4 may operate in more or less similar fashion to frequency-based logical channels such as 382a-e depicted in FIG. 3.

Figure 5:
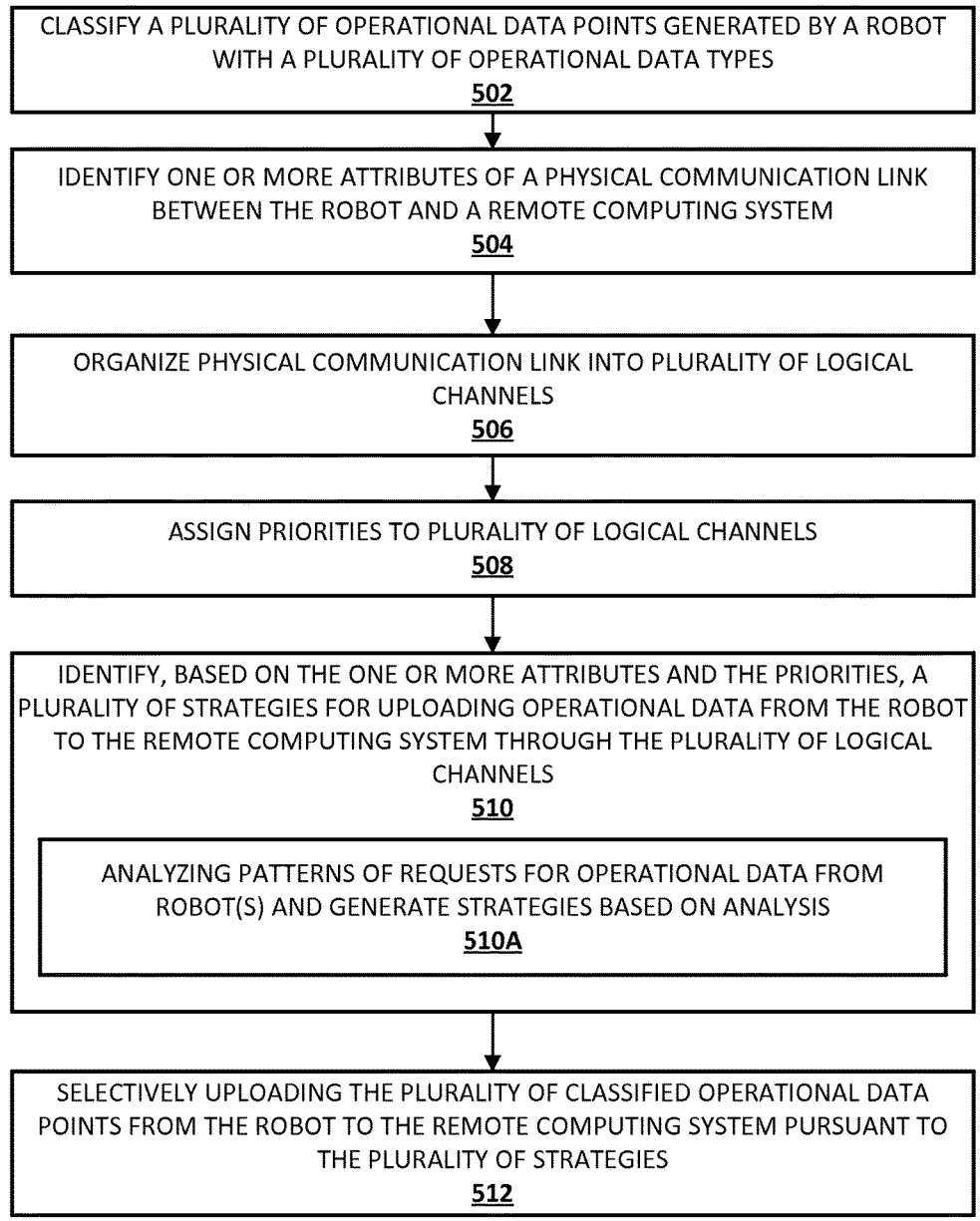
FIG. 5 depicts an example method for selectively uploading operational data from a robot to a remote computing system based on one or more attributes of a physical communication link between the robot and the remote computing system, in accordance with various implementations.

Referring now to FIG. 5, an example method 500 of selectively uploading and/or storing operational data pursuant to various strategies based on one or more attributes of a physical communication link between a robot (e.g., 100) and a remote computing system (e.g., robot management system 150) is depicted. For convenience, the operations of flow charts are described with reference to a system that performs the operations. This system may include various components of various computer systems, including elements of robot 100 and/or robot management system 150. Moreover, while operations of method 500 are shown in a particular order, this is not meant to be limiting. One or more operations may be reordered, omitted, or added.

At block 502, the system may classify a plurality of operational data points generated by a robot with a plurality of operational data types. At block 504, the system may identify one or more attributes of a physical communication link (e.g., 120, 220, 320, 420) between a robot (e.g., 100) and a remote computing system (e.g., 150). Examples of attributes of physical communication links that may be identified were discussed previously, and include attributes such as bandwidth, error rate, QoS parameters, etc.

At block 506, the system may organize (e.g., multiplex) the physical communication link into a plurality of logical channels, as depicted in FIG. 3 or 4. Each logical channel may be associated with one or more operational data types. At block 508, the system may assign priorities to the plurality of logical channels. In some implementations, a priority assigned to a logical channel may be determined based on an importance attributed to an operational data type associated with that logical channel. At block 510, the system may identify, based on the one or more attributes of the physical communication link identified at block 504 and the priorities assigned to the logical channels at block 508, a plurality of strategies for uploading operational data from the robot to the remote computing system.

In some implementations, identifying the strategies may include generating strategies. For example, at optional block 510A (which may be performed contemporaneously with the other operations of FIG. 5 or at a different point in time, such as earlier), the system may analyze historical patterns of requests for operational data from the robot. Based on this analysis, the system may automatically generate strategies. Suppose technicians routinely request robot heartbeat when a reliability of a physical communication link between the robot and a remote computing system is weak and/or unreliable, e.g., to make sure the robot is still operational. The system may "learn" from this behavior that when the physical communication link is weak and/or unreliable, a strategy that provides the robot heartbeat at various intervals is desired. Accordingly, when the system determines that the physical communication link is weak and/or unreliable at block 504, the system may identify at least one strategy at block 508 that will cause the robot to upload its heartbeat in a manner similar to that observed from the analysis performed at block 510A. At block 512, the system may selectively upload operational data to the remote computing system pursuant to the strategies identified at block 508.

Figure 6:
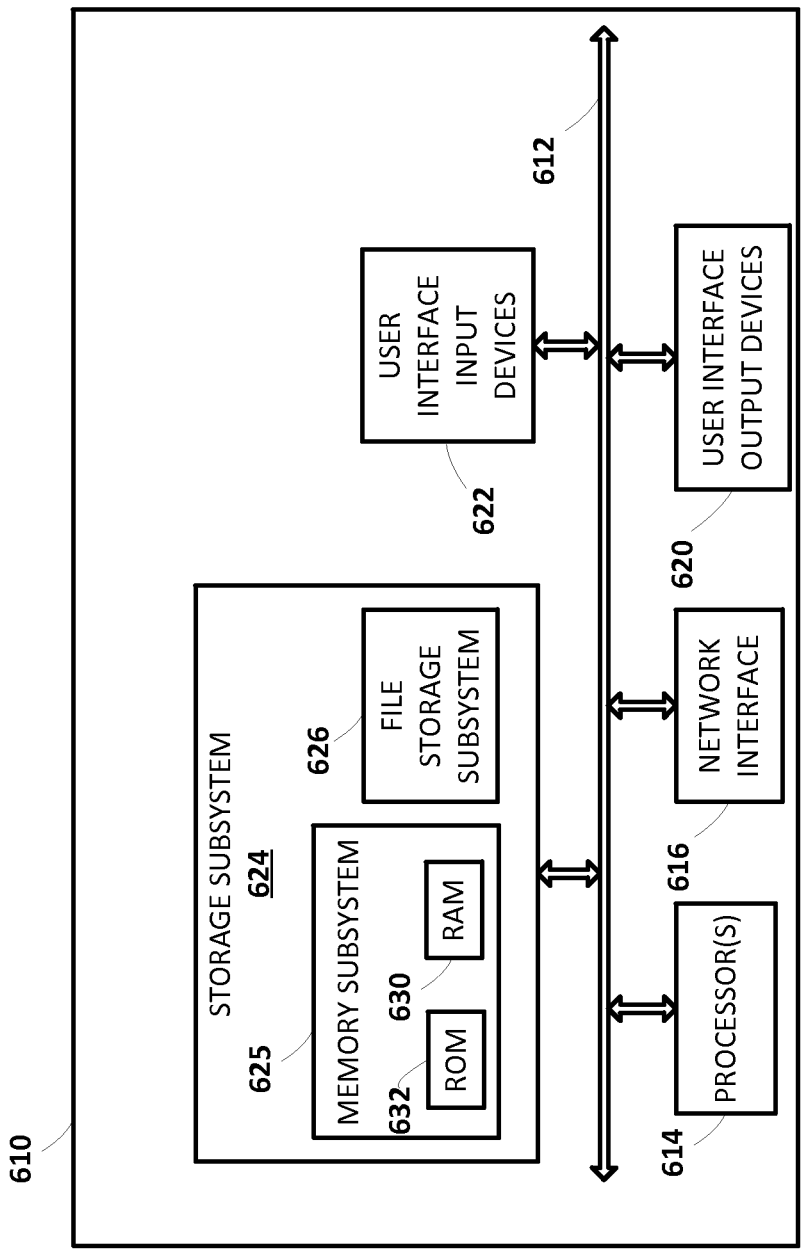
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500, and/or to implement one or more aspects of robot 100 and/or robot management system 150. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:
operating a robot to move around an environment to perform one or more tasks;
classifying, by the robot, a plurality of operational data points generated by the robot while it moves around the environment with a plurality of operational data types;
monitoring, by the robot, one or more attributes of a wireless communication link between the robot and a remote computing system to detect that the wireless communication link has become degraded as a consequence of the movement of the robot around the environment, wherein the monitoring is based on information obtained from one or more wireless communication interfaces of the robot;
organizing, by the robot, the wireless communication link into a plurality of logical channels, wherein the logical channels are associated with at least two different operational data types corresponding to at least two different sources of the plurality of classified operational data points;
assigning a priority to each logical channel of the plurality of logical channels based on the operational data type of the at least two different operational data types that is associated with the logical channel;
identifying, by the robot, based on the detected degradation of the wireless communication link and one or more of the priorities assigned to one or more of the plurality of logical channels, a plurality of strategies for uploading operational data from the robot to the remote computing system, wherein the plurality of strategies determine how operational data points of the at least two operational data types are uploaded, and wherein at least one of the plurality of strategies is generated automatically based on a pattern of operational data requests transmitted to one or more robots over one or more respective wireless communication links while the one or more respective wireless communication links were degraded; and
selectively uploading the plurality of classified operational data points from the robot to the remote computing system via the logical channels and pursuant to the plurality of strategies.

2. The method of claim 1, wherein the one or more attributes of the wireless communication link comprises available bandwidth and the at least two operational data types correspond to data that is generated by the robot during operation.

3. The method of claim 1, wherein the wireless communication link is associated with a range of wireless frequencies, and the logical channels correspond to sub-ranges of frequencies of the range of wireless frequencies.

4. The method of claim 3,
wherein the assigning includes assigning a priority to each logical channel further based on a size of a sub-range of frequencies of the sub-ranges of frequencies.

5. The method of claim 1, wherein the selectively uploading comprises uploading a statistic computed based on operational data points of a particular operational data point type pursuant to a strategy associated with the particular operational data point type.

6. The method of claim 1, wherein the selectively uploading comprises uploading a latest operational data point of a set of operational data points of a particular operational data point type pursuant to a strategy associated with the particular operational data point type.

7. The method of claim 1, wherein the at least two different sources of the operational data points include a sensor that is connected to the robot.

8. The method of claim 1, wherein one of the plurality of operational data types comprises robot heartbeats.

9. The method of claim 1, wherein one of the plurality of operational data types comprises robot location.

10. The method of claim 1, wherein organizing the wireless communication link into the plurality of logical channels is performed dynamically based at least on the plurality of operational data points generated by the robot.

11. A robot comprising one or more processors and memory storing instructions that cause the one or more processors to:
operate a robot to move around an environment to perform one or more tasks;
classify a plurality of operational data points generated by the robot while it moves around the environment with a plurality of operational data types;
monitor one or more attributes of a wireless communication link between the robot and a remote computing system to detect that the wireless communication link has become degraded as a consequence of the movement of the robot around the environment, wherein the monitoring is based on information obtained from one or more wireless communication interfaces of the robot;
organize, by the robot, the wireless communication link into a plurality of logical channels, wherein the logical channels are associated with at least two different operational data types corresponding to at least two different sources of the plurality of classified operational data points;
assign a priority to each logical channel of the plurality of logical channels based on the operational data type of the at least two different operational data types that is associated with the logical channel;
identify, based on the detected degradation of the wireless communication link and one or more of the priorities assigned to one or more of the plurality of logical channels, a plurality of strategies for uploading operational data from the robot to the remote computing system, wherein the plurality of strategies determine how operational data points of the at least two operational data types are uploaded, and wherein at least one of the plurality of strategies is generated automatically based on a pattern of operational data requests transmitted to one or more robots over one or more respective wireless communication links while the one or more respective wireless communication links were degraded; and
selectively upload the plurality of classified operational data points from the robot to the remote computing system via the logical channels and pursuant to the plurality of strategies.

12. The robot of claim 11, wherein the at least two operational data types correspond to data that is generated by the robot during operation.

13. The robot of claim 11, wherein the wireless communication link is associated with a range of wireless frequencies, and the logical channels correspond to sub-ranges of frequencies of the range of wireless frequencies.

14. The robot of claim 13,
wherein the assigning includes assigning a priority to each logical channel based on a size of a sub-range of frequencies of the sub-ranges of frequencies.

15. At least one non-transitory computer-readable medium comprising instructions that, in response to execution of the instructions by one or more processors, cause the one or more processors to perform the following operations:

operating a robot to move around an environment to perform one or more tasks;

classifying, by the robot, a plurality of operational data points generated by the robot while it moves around the environment with a plurality of operational data types;

monitoring, by the robot, one or more attributes of a wireless communication link between the robot and a remote computing system to detect that the wireless communication link has become degraded as a consequence of the movement of the robot around the environment, wherein the monitoring is based on information obtained from one or more wireless communication interfaces of the robot;

organizing, by the robot, the wireless communication link into a plurality of logical channels, wherein the logical channels are associated with at least two different operational data types corresponding to at least two different sources of the plurality of classified operational data points;

assigning a priority to each logical channel of the plurality of logical channels based on the operational data type of the at least two different operational data types that is associated with the logical channel;

identifying, by the robot, based on the detected degradation of the wireless communication link and one or more of the priorities assigned to one or more of the plurality of logical channels, a plurality of strategies for uploading operational data from the robot to the remote computing system, wherein the plurality of strategies determine how operational data points of the at least two operational data types are uploaded, and wherein at least one of the plurality of strategies is generated automatically based on a pattern of operational data requests transmitted to one or more robots over one or more respective wireless communication links while the one or more respective wireless communication links were degraded; and selectively uploading the plurality of classified operational data points from the robot to the remote computing system via the logical channels and pursuant to the plurality of strategies.

* * * * *